(12) United States Patent
Falchero et al.

(10) Patent No.: US 6,932,409 B2
(45) Date of Patent: Aug. 23, 2005

(54) VEHICLE SEAT HAVING A FOLD AND TUMBLE SUPPORT ASSEMBLY

(75) Inventors: Angelo Falchero, Turin (IT); Enrico Bruno, Perosa Argentina (IT); Alberto Cartosio, Turin (IT)

(73) Assignee: Lear Corporation, Southfield, MI (US)

( * ) Notice: Subject to any disclaimer, the term of this patent is extended or adjusted under 35 U.S.C. 154(b) by 45 days.

(21) Appl. No.: 10/725,247

(22) Filed: Dec. 1, 2003

(65) Prior Publication Data

US 2005/0116493 A1    Jun. 2, 2005

(51) Int. Cl.[7] .............................. B60N 2/10; B60N 2/30
(52) U.S. Cl. ............................. 296/65.09; 296/65.01; 296/65.05; 297/336
(58) Field of Search ...................... 296/65.09, 65.05, 296/65.01, 65.03, 65.16; 297/334–336

(56) References Cited

U.S. PATENT DOCUMENTS

| | | |
|---|---|---|
| 4,699,418 A | 10/1987 | Plavetich |
| 4,869,541 A | 9/1989 | Wainwright |
| 5,593,208 A | 1/1997 | Mitschelen et al. |
| 5,871,255 A | 2/1999 | Harland et al. |
| 5,941,602 A | 8/1999 | Sturt et al. |
| 6,000,742 A | 12/1999 | Schaefer et al. |
| 6,012,755 A | 1/2000 | Hecht et al. |
| 6,024,411 A | 2/2000 | Pesta et al. |
| 6,039,401 A | 3/2000 | Rus |
| 6,135,555 A | 10/2000 | Liu et al. |
| 6,227,619 B1 | 5/2001 | Pesta et al. |

(Continued)

FOREIGN PATENT DOCUMENTS

DE    10201234 C1    1/2003

(Continued)

Primary Examiner—Dennis H. Pedder
Assistant Examiner—Greg Blankenship
(74) Attorney, Agent, or Firm—Bliss McGlynn, P.C.; Bill Panagos (57) ABSTRACT

A vehicle seat assembly including a seat backrest, a seat bottom, and a seat frame having a front member and a rear member. The seat frame operatively supports the seat bottom and further has at least one backrest rotating mechanism that is adapted to allow said seat backrest to move between an upright position and a folded position. The seat frame further has a first pair of linkage attachment points on the front member to allow the rear member of the seat frame to be rotatively lifted upward and forward and move the seat frame from a seating position to a tumbled position. A tumble mechanism has a first and a second linkage arm, and a base plate that is fixedly mounted to the vehicle floor and is operatively disposed between the front member of the seat frame and the vehicle floor. The first and second linkage arms are operatively and pivotably mounted to the front member of the seat frame and are pivotably mounted to the base plate. The first and second linkage arms are of different lengths such that the first and second linkage arms provide two unequal length lever arms, which work cooperatively to cause the front member of the seat assembly to move rearward in an arcuate path as the rear member is lifted.

20 Claims, 4 Drawing Sheets

U.S. PATENT DOCUMENTS

| | | |
|---|---|---|
| 6,293,620 B1 | 9/2001 | Fast |
| 6,520,581 B1 * | 2/2003 | Tame .......................... 297/336 |
| 6,601,900 B1 * | 8/2003 | Seibold .................... 296/65.09 |
| 6,679,536 B1 * | 1/2004 | Sonnenberg et al. ..... 296/65.09 |
| 6,688,666 B2 * | 2/2004 | Neale et al. ............. 296/65.09 |
| 6,793,285 B1 * | 9/2004 | Tame .......................... 297/336 |
| 2004/0124684 A1 * | 7/2004 | Bonk .................... 297/378.12 |

FOREIGN PATENT DOCUMENTS

| | | | |
|---|---|---|---|
| GB | 2336772 A | 3/1999 | |
| JP | 357104425 A * | 6/1982 | .............. 296/65.09 |
| JP | 360001033 A * | 1/1985 | .............. 296/65.05 |
| JP | 401052536 A * | 2/1989 | .............. 296/65.05 |
| WO | WO 99/59836 | 11/1999 | |

\* cited by examiner

VEHICLE SEAT HAVING A FOLD AND TUMBLE SUPPORT ASSEMBLY

BACKGROUND OF THE INVENTION

1. Field of the Invention

The present invention relates, generally, to a vehicle seat support assembly and, more specifically, to a vehicle seat fold and tumble support assembly.

2. Description of the Related Art

To satisfy the demands of the modern driving public, manufacturers are called upon to provide vehicles that are multi-functional and, in addition to having normal passenger carrying capacity, also provide expandable or additional cargo carrying capability. One way to accomplish this goal and increase the vehicle's cargo space to accommodate large or bulky items that need to be transported is to flatten, fold, and/or collapse one or more of the rear seat assemblies. A conventional approach of collapsing rear vehicle seat assemblies to provide additional storage space is one in which the seat back portion folds down onto the seat cushion and then the rear of the seat support assembly is released from the vehicle floor so that the entire seat pivots, or tumbles, forward about the front floor mounting. These seats generally, and their support assemblies more specifically, are referred to as "fold and tumble."

Fold and tumble seat designs vary greatly and are used in different ways in different vehicle types. Fold and tumble seats often appear in 3 and 5 door vehicles in which the rear, or secondary seating is folded and tumbled to open up a rear cargo area when desired. Fold and tumble seats are also employed in mini-van and SUV vehicle types where the secondary seats may fold and tumble to provide ingress and egress to third row seating or to provide additional cargo space if the third row is folded down or removed. Regardless of their specific application, the current fold and tumble seat designs and the manner in which the folded seat tumbles have proven to be problematic.

While the various fold and tumble seat approaches to providing additional cargo space in the rear vehicle area have been successful for their intended purpose, they concomitantly encroach upon and reduce forward passenger seating space and thus leave room for improvement. More specifically, when a conventional fold and tumble seat is tumbled forward, the conventional seat support assemblies cause the folded seat to occupy a significant area behind the front seat. If the front seat is positioned toward the back of the vehicle, to accommodate a tall occupant for example, then the front seat must be moved forward to accommodate the tumbled seat. Similarly, if the front seat is in a more forward position, the tumbled seat then rests in behind the front seat so that the front seat is prevented from being moved back to provide legroom or a comfortable seating position for the front seat occupant. Thus, there is a need in the art for a vehicle seat that provides additional rear area cargo space by having fold and tumble capabilities but that does not reduce the vehicle forward seating area.

SUMMARY OF THE INVENTION

The disadvantages of the related art are overcome by the present invention that provides a vehicle seat assembly having a backrest locking assembly. The present invention includes a seat backrest, a seat bottom, and a seat frame having a front member and a rear member. The seat frame operatively supports the seat bottom and further has at least one backrest rotating mechanism supported at the rear member that is adapted to allow the seat backrest to move between an upright position and a folded position in which said seat backrest is folded down upon said seat bottom. The seat frame further has at least one first pair of linkage attachment points on the front member to allow the rear member of the seat frame to be rotatively lifted upward and forward and move the seat frame from a seating position to a tumbled position relative to the front member. At least one tumble mechanism is operatively disposed between the front member of the seat frame and the vehicle floor, the tumble mechanism has a first and a second linkage arm, and a base plate fixedly mounted to the vehicle floor. The first and second linkage arms are operatively and pivotably mounted to the front member of the seat frame and pivotably mounted to the base plate. The first and second linkage arms are of different lengths such that the first and second linkage arms provide two unequal length lever arms, which work cooperatively to cause the front member of the seat assembly to move rearward in an arcuate path as the rear member is lifted.

Thus, the present invention provides a vehicle seat assembly with a fold and tumble support assembly that draws the seat backward as it is tumbled forward thereby preventing it from impinging upon and occupying the space behind the front seat. In this manner, the present invention provides a larger allows the area behind the front seat to be occupied by the front seat when it is necessary to move the front seat back for legroom and riding comfort of the front seat occupant.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
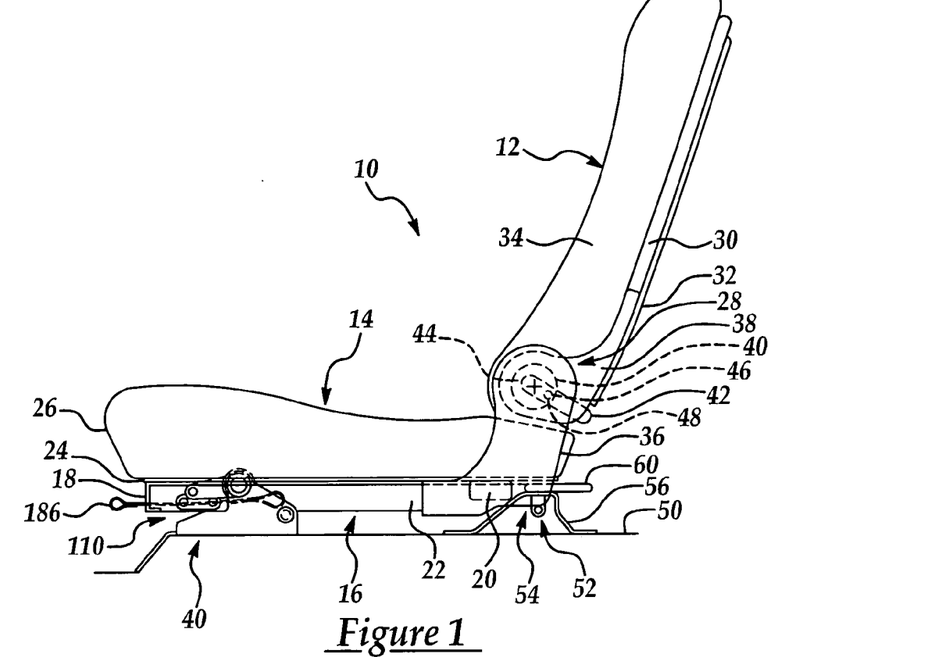
FIG. 1 is a side view of a seat assembly of the present invention in the upright position.

A vehicle seat assembly having a having a fold and tumble support assembly of the present invention is generally indicated as 10 in FIG. 1 where like numerals are employed to designate like structure throughout the figures. The seat assembly 10 includes a seat backrest generally indicated at 12, a seat bottom generally indicated at 14, and a seat frame generally indicated at 16. The seat frame 16 has a front member 18, a rear member 20, and two side members 22. The front and rear members 18 and 20 are disposed in spaced parallel relationship with the two side members 22 disposed therebetween at the ends of the front and rear members 18 and 20 to form a generally rectangular shape. The seat bottom 14 includes a seat pan 24 and a seat cushion 26. The seat pan 24 is formed or stamped from any one of a variety of moldable or malleable materials in a known manner to provide a generally flat shaped pan, which supports the seat cushion 26. The seat bottom 14 is mounted to and is operatively supported by the seat frame 16. It should be appreciated by those having ordinary skill in the art that the seat pan 24 may be mounted to the seat frame 16 in any known manner such as cooperative nuts 25 and bolts 27 as illustrated, for example in FIG. 3. The seat frame 16 further supports at least one backrest rotating mechanism, generally indicted at 28, which is mounted to the rear member 20.

The seat backrest 12 includes a backrest frame 30, a trim cover 32, and a backrest cushion 34. The seat backrest rotating mechanism 28 is operatively mounted between the rear member 20 of the seat frame 16 and the backrest frame 30 and is adapted to allow the seat backrest 12 to move between an upright position and a folded position in which the seat backrest 12 is folded down upon the seat bottom 14. The seat backrest rotating mechanism 28 includes a seat frame bracket 36, a backrest bracket 38, locking ring 40, and a release lever 42. The seat frame bracket 36 is mounted to the rear and side members 20, 22 of the seat frame 16 and the backrest bracket 38 is mounted to the backrest frame 30. The seat frame bracket 36 and the backrest bracket 38 operatively cooperate to allow rotation of the seat backrest 12 from an upright seating position to a folded position. The locking ring 40 is generally disk-shaped and has an outer face 44 with at least one lock opening 46. The locking ring 40 is operatively mounted to the backrest bracket 38. The release lever 42 is operatively mounted to the seat frame bracket 36 and includes a lock pin 48 that cooperates with and engages the lock opening 46 in the locking ring 40 to lock the backrest in the upright position. The mounting of the release lever 42 allows for a selective movement away from the face 44 of the locking ring 40 such that the lock pin 48 may be selectively disengaged from the locking ring 40 so that the seat backrest is released and may be folded. It should be appreciated that an additional lock opening may be employed on the locking ring 40 at a point that would allow the release lever 42 to engage and hold the backrest 12 to the seat bottom 14 in the folded position. It should be further appreciated that a number of additional lock openings may also be employed on the locking ring 40, which would allow the seat backrest to be selectively moved and locked in place at a variety of reclining positions as is known in the art.

It should be still further appreciated that in regard to the number of various mechanisms necessary to move portions of a particular seat assembly, the physical size of the seat is often the determining factor. For example, in the continuing effort to provide flexibility in seating arrangements and cargo space, many vehicles are outfitted with more than one mid or rear fold and tumble seat assembly, which allows for a selective split of seating and cargo space. In a similar manner, if the fold and tumble seating is used to provide ingress and egress access to seating farther back in the vehicle, the split seating arrangement for the mid-body seats allows easier access to the rear seats by requiring only a portion of the mid-body seat to be tumbled forward. Where more than one mid or rear seat is used, the individual seats are generally referred to by their relative percentage of width across the seating area. For example, two unequal width seats may be installed in the rear seating area of a vehicle such that one seat covers 60% of the seating area and the other seat covers 40%. Thus, the vehicle has a "60-40" rear seating arrangement. A narrower seat, such as a 40%, or even a 20% seat, may not need more than one reclining, pivoting, or tumbling mechanism whereas a wider (80 or 100%, for example) seat may require two or more of each such mechanisms to properly support the seat.

Figure 3:
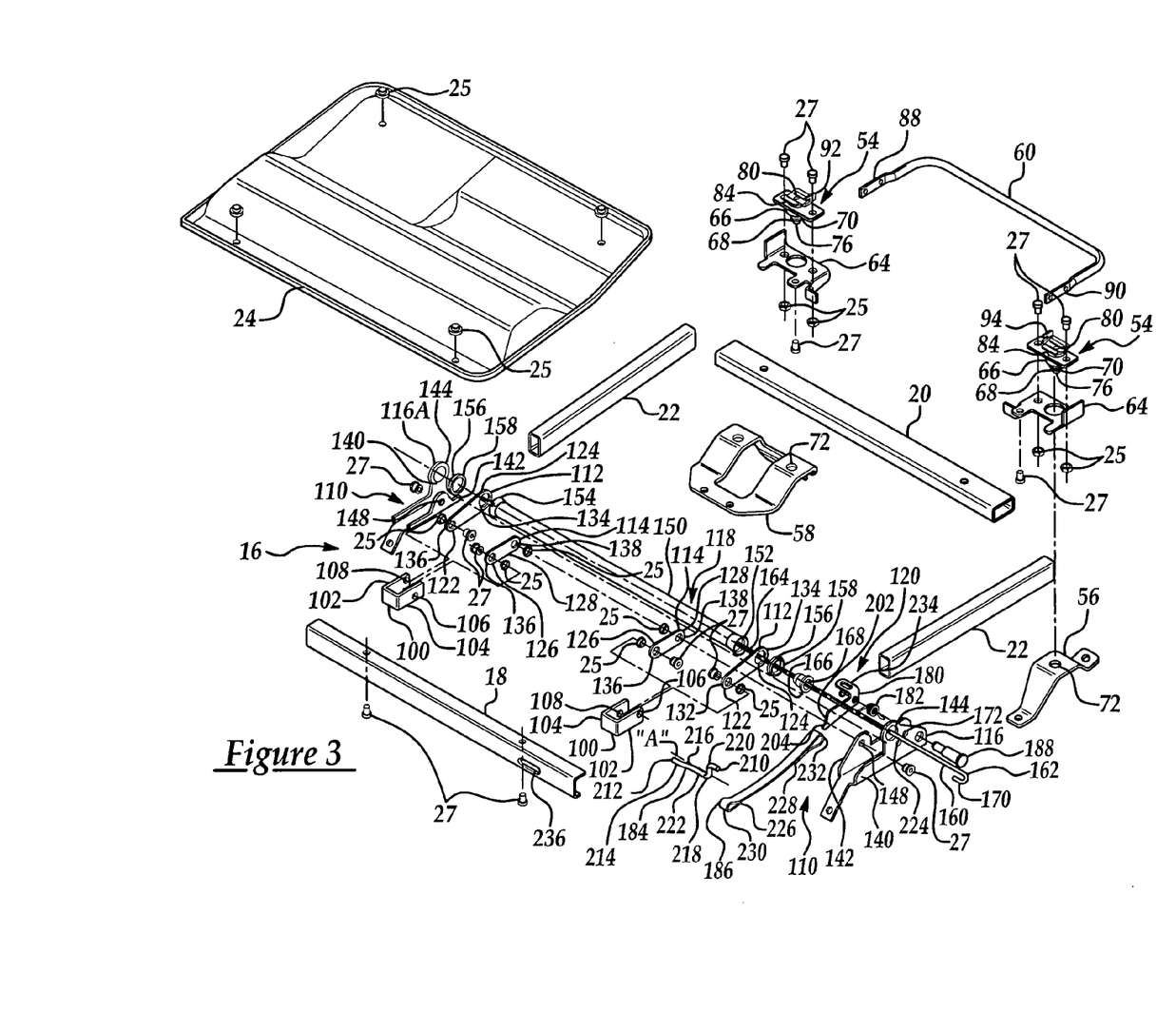
FIG. 3 is an exploded perspective view of the lower portion of the seat assembly of the present invention.

Since the seat assembly 10 of the present invention is of a mid, or rear seat configuration, the preferred embodiment of the present invention remains stationary with respect to the vehicle floor 50 when in the seating position, as illustrated in the figures. However, it should be appreciated that the seat 10 may have a seat frame that is either manually or power adjustable with respect to the vehicle floor 50, which would allow for the selective movement of the seat assembly to any of a wide variety of positions in fore and aft movement and in seat tilt. Regardless, as illustrated herein, the rear of the seat frame 16 is operatively held to the floor of the vehicle 50 in one location when the seat is in the upright seating position. In that regard, the seat assembly 10 further includes at least one rear floor striker assembly generally indicated at 52. The floor striker assembly 52 includes a ball latch assembly generally indicated at 54 and a floor striker bracket 56. As shown in FIG. 3, the preferred embodiment of the seat assembly 10 includes two rear floor ball latch assemblies 54 and two striker brackets 56 and 58. Each of the ball latch assemblies 48 are operatively disposed on the underside of the ends of the rear member 20 and are operatively joined by a release bar 60. The two floor striker brackets 56, 58 are fixedly mounted to the vehicle floor 50 beneath the ball latch assemblies 54, such that when the seat is placed in the seating position, the ball latch assemblies 54 engage the floor striker brackets 56, 58 and hold the rear of the seat assembly 10 to the floor 50.

The ball latch assemblies 54 have a ball latch bracket 64 that is fixedly mounted to the rear member 20 of the seat assembly 10. A ball latch 66 is fixedly mounted in the ball latch bracket 64. It should be appreciated that the ball latch assemblies 54 may be mounted to the seat frame 16 in any known manner such as cooperative nuts 25 and bolts 27 as illustrated, for example in FIG. 3. The ball latch 66 has a locating pin 68 with at least one captured and spring biased ball 70 that protrudes laterally from the side of the locating pin 68 to engage a latch opening 72 in the striker bracket 56, 58. It should be appreciated that the figures illustrate one of a fold and tumble split seat arrangement and more specifically, a left seat. Thus, as illustrated, floor striker plate 58 fits between and provides a latching attachment point for both the left seat as illustrated and for the right seat (not shown). The locating pin 68 has a chamfered end 76 to assist in guiding the locating pin 68 into the latch opening 72 as the seat is moved to the seating position. When the seat assembly 10 is brought to the seating position, the locating pin 68 is set into the latch opening 72 and the ball 70 is depressed against its spring (not shown) as it passes through the latch opening 72. After the ball 70 passes the latch opening 72 in the floor striker bracket 56, 58 it re-extends by the biasing force of the spring to hold the seat assembly 10 to the floor striker bracket 56, 58.

To provide the ability to release the rear of the seat assembly 10 from the floor 24, each of the locating pins 68 of the ball latches 66 are hollow such that a release pin 80 is disposed within the locating pins 68, which interact with the spring loaded balls 70. Each of the release pins 80 extend upward from the top of the locating pin 68 and are further pivotably mounted to a release plate 84. When the release plate 84 is tilted, the release pin 80 is lifted within the hollow locating pin 68, which releases the spring tension on the ball 70. Each of the two ends 88 and 90 of release bar 60 are fixedly mounted to the two release plates 84 at 92 and 94, respectively. When the release bar 60 is lifted, the movement of the release pins 80 causes the spring tension on the balls 70 to be released allowing the ball latches 66, and thereby the rear of the vehicle seat, to be lifted from the floor striker brackets 56, 58.

At its front, the seat frame 16 of the present invention has at least one pair of linkage attachment points on the front member 18. More specifically, the front member 18 of the seat frame 16 has at least one pivot bracket 100, which has two legs 102, 104 that extend rearward from the front member 18 in a general "u-shape". An opening is formed in each of the legs 102, 104 that serve as the first pair of linkage attachment points 106 and 108, respectively. The first pair of linkage attachment points 106, 108 are formed at dissimilar, or non-coaxial, relative positions on the legs 102, 104 of the pivot bracket 100 such that one of the pair of linkage attachment points is higher relative to the vehicle floor than the other. As will be described in greater detail below, the first pair of linkage attachment points 106, 108 allow the rear member 20 of the seat frame 16 to be lifted upward and rotated forward (tumbled) relative to the front member 18 during the movement of the seat frame 16 from the seating position to the tumbled position.

The seat assembly 10 also includes at least one tumble mechanism generally indicated at 110, which is operatively disposed between the front member 18 of the seat frame 16 and the vehicle floor 50. The tumble mechanism 110 includes first and second linkage arms 112 and 114, a base plate 116, a torsion tube assembly generally indicated at 118, and a blocking assembly generally indicated at 120. It should be appreciated that if two tumble mechanisms 110 are used in the particular application, one disposed on either side of the seat frame 16, as illustrated in the preferred embodiment herein, then only one blocking assembly 120 is necessary such that a smaller base plate 116A may be employed on that particular side of the seat frame. The first linkage arm 112 has a proximate end 122 and a distal end 124, and the second linkage arm 114 has a proximate end 126 and a distal end 128. In the preferred embodiment, the first and second linkage arms 112, 114 are of unequal length. Openings are formed in the proximate and the distal ends 122 and 124 of the first linkage arm 112 to provide pivot attachment points 132 and 134, respectively. Openings are formed in the proximate and the distal ends 126 and 128 of the second linkage arm 114 to provide pivot attachment points 136 and 138, respectively. The pivot attachment point 134 at the distal end 124 of the first linkage arm 112 is of a larger diameter to accommodate an operative attachment to the torsion tube assembly 118 as will be discussed in greater detail below. The base plate 116, 116A is fixedly mounted to the vehicle floor 50. The base plate 116, 116A has two vertical sides 140 and 142 that each have a formed opening to provide a second pair of linkage attachment points 144 and 148, respectively. The second pair of linkage attachment points 144, 148 on the base plate 116, 116A are formed at dissimilar, or non-coaxial, relative positions, such that one of the pair of linkage attachment points is higher relative to the vehicle floor than the other.

The first and second linkage arms 112, 114 are operatively disposed between the base plate 116, 116A and the front member 18 of the seat frame 18. More specifically, the distal end pivot attachment points 134 and 138 of the first and second linkage arms 112, 114 are operatively and pivotably mounted to the second pair of linkage attachment points 144 and 148 on the base plate 116, 116A, respectively. The proximate end pivot attachment points 132 and 134 of the first and second linkage arms 112 and 114 are operatively and pivotably mounted to the first pair of linkage attachment points 106, 108 on the front member 18 of the seat frame 16.

The linkage attachment point 114 in the base plate 116, 116A is also a larger diameter opening to accommodate its operative connection to the distal end 124 of the first linkage arm 112 and the torsion tube assembly 118. It should be appreciated that the first and second linkage arms 112 and 114 may be pivotably mounted to the seat frame 16 and the base plate 116, 116A in any known manner such as cooperative nuts 25 and bolts 27 as illustrated in FIG. 3, for example.

Figure 2:
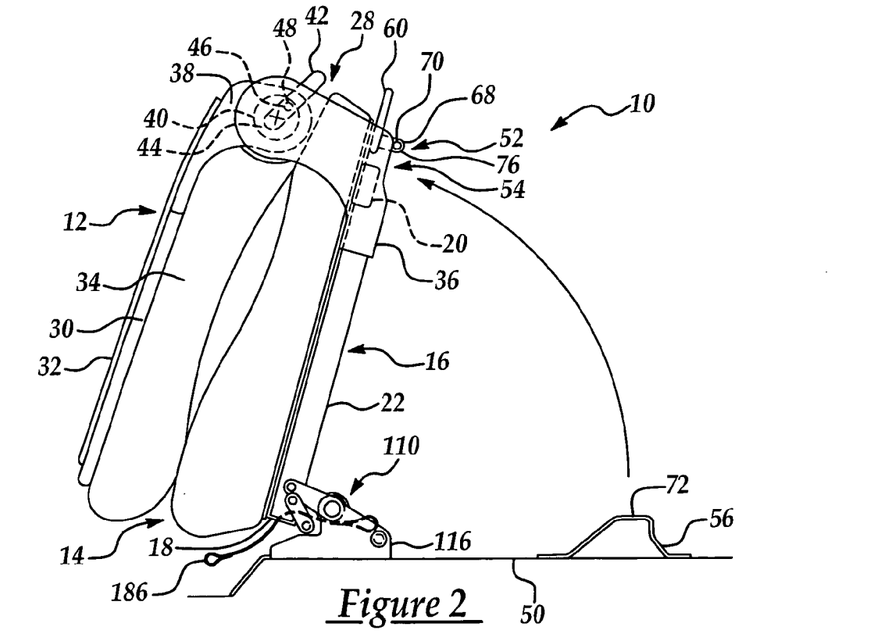
FIG. 2 is a side view of a seat assembly of the present invention tumbled forward.

To assist in raising the seat assembly 10 from the folded position to the tumbled position (FIG. 2), the torsion tube assembly 118 is operatively mounted between the two tumble mechanisms 110 of the preferred embodiment. More specifically, the two tumble mechanisms 110 are mounted, one on each end of the front member 18, such that the torsion tube assembly 118 is disposed between both. As will be discussed in greater detail below, the ends of the torsion tube assembly 118 are operatively fixed to the first linkage arms 112 of the two tumble mechanisms 110 thereby operatively joining the first linkage arms 112 together to cause both of the tumble mechanisms 110 to pivot in unison when the seat assembly is lifted. The torsion tube assembly 118 also provides a biasing force to assist in the lifting of the seat assembly 10 to its tumbled position. The torsion tube assembly 118 includes a tube body 150 having a proximate 152 and a distal 154 end. The tube body 150 extends between the base plates 116, 116A of the two tumble assemblies 110 and is fixedly mounted to the distal ends 124 of the first linkage arms 112 at the pivot attachment points 134. It should be appreciated that any known method of mechanical attachment may be used to operatively connect the first linkage arms 112 to the tube body 150 such as welding, or splined engagement for example. Each of a pair of bushings 156 is disposed within each end of the tube body 150 and within opening that acts as the linkage attachment point 144 on the base plate 116, 116A. The bushing 156 has a raised ridge 158 disposed circumferentially about its outer diameter to prevent the bushing 156 from displacing and to provide a standoff to separate the first linkage arm 112 from directly contacting the base plate 116, 116A.

Figure 4:
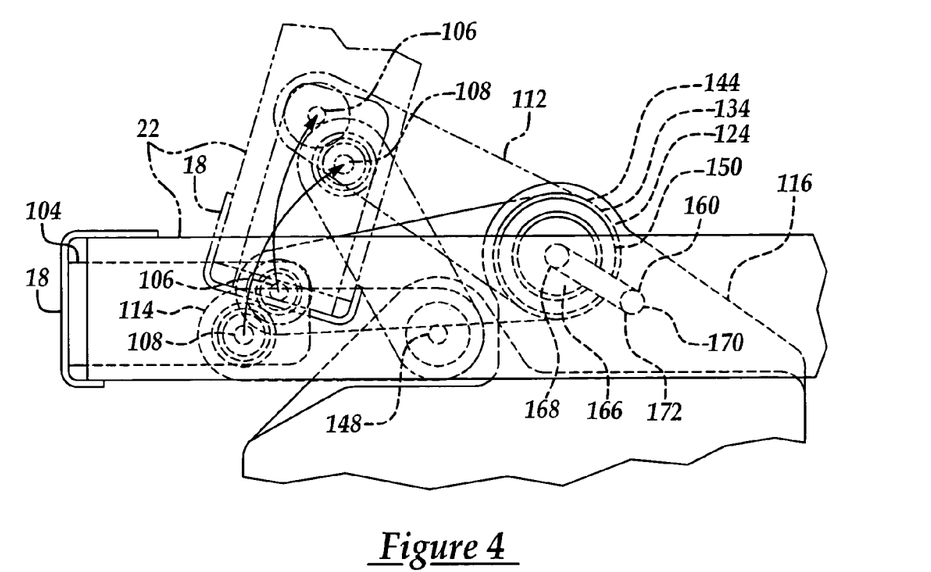
FIG. 4 is a side view of the tumble mechanism of the present invention.

As shown in FIG. 4, with the seat assembly 10 operatively placed in the seating position, the first linkage arms 112 are located in a relatively horizontal position. When the seat assembly 10 is operatively moved to the tumbled position, the first linkage arms 112 are angularly displaced in a clockwise manner. Thus, the torsion tube 150 also rotates in a like manner. The lifting assistance to the movement of the seat assembly 10 is provided by a torsion rod 160. As best shown in FIG. 3, the torsion rod 160 is disposed within the tube body 150 and has a proximate end 162 and a distal end 164. More specifically, a tube cap 166 having a central opening 168 is disposed in the proximate end 152 of the tube body 150. The distal end 164 of the torsion rod 160 is inserted into the tube body 150 through the central opening 168 of the tube cap 166. The proximate end 164 of the tension rod 160, which is left to extend out through the tube cap 166 from the proximate end 152 of the tube body 150, is formed into a hook 170. The hook 170 is inserted into and received by an opening 172 in the side 140 of the base plate 116 and the distal end 164 of the torsion rod 160 is fixedly mounted to the interior of the distal end 154 of the tube body 150 in a known manner. During construction of the seat assembly 10 the angular orientation of the first linkage arms 112 in relation to the angular placement of the hook end 170 in the base plate 116 as the torsion rod is fixedly mounted to the distal end of the tube body 150 is such that the first linkage arms 112 and the torsion tube assembly 118 must be rotated in a counter-clockwise direction to allow further assembly. This causes the torsion rod 160 to be twisted along its length in a clockwise manner relative to the tube body 150 such that a clockwise torsional biasing force is imparted to the tube body 150. Thus, this clockwise torsional biasing force causes the tube body 150, and thereby the first linkage arms 112, to maintain a preloaded angular biasing force that assists in the rotational movement of the tumble mechanism 110, and thereby the seat assembly 10, when moved from the seating position to the tumbled position.

As previously discussed, the first pair of linkage attachment points 106, 108 are formed at dissimilar, or non-coaxial, relative positions on the legs 102, 104 of the pivot bracket 100. The linkage attachment point 108 for the proximate end 122 of the first linkage arm 112 is located generally higher and more rearward than the linkage attachment point 108 for the proximate end 126 of the second linkage arm 114. Likewise, the second pair of linkage attachment points 144, 148 on the base plate 116, 116A are also formed at dissimilar, or non-coaxial, relative positions, with the linkage attachment point 144 for the distal end 124 of the first linkage arm 112 located generally higher and more rearward than the linkage attachment point 148 for the distal end 128 of the second linkage arm 114.

In this manner, as can be seen in the figures, the different length first and second linkage arms 112, 114 and the dissimilar placement of the first and second pair of linkage attachment points 106, 108 and 144, 148 are adapted to provide two unequal length lever arms that work cooperatively to cause the front member 18, and thus the seat frame 16 of the seat assembly 10 to move rearward as the rear member 20 is rotatively lifted. In other words, the seat assembly 10 of the present invention does not have a typical fixed front pivot point about which the remainder of the seat assembly 10 will rotate as the rear of the seat frame 16 is lifted and pivoted forward (i.e. tumbled). Instead, as the seat assembly 10 of the present invention is tumbled forward, the tumble mechanism 110 causes the front member 18 of the seat to move (i.e. swing) in a rearward arcuate path, which brings the folded and tumbled seat assembly 10 rearward and keeps the seat from occupying a portion of the area located immediately behind the vehicle front seats. More specifically, as shown in the figures, when the seat assembly 10 is operatively moved to the tumbled position, the first and second linkage arms 112 and 114 are angularly displaced in a clockwise manner. Since the linkage arms 112, 114 are both attached to front member 18, but at different points relative points, the joint movement of the linkage arms 112, 114 forces the front member 18 to not only rotate about the first pair of linkage attachment points 106 and 108 but also to partially revolve in an upwardly rising, rearward arcuate curve as the linkage arms 112, 114 themselves rotate about the second linkage attachment points 144, 148. It should be appreciated that the arcuately curved path of the front member 18, and thereby the placement of the entire seat assembly in its tumbled position may be adjustable to the particular application by changing the relative placement of the linkage attachment points 106, 108 144, and 148 and changing the relative length of the first and second linkage arms 112 and 114.

Figure 5:
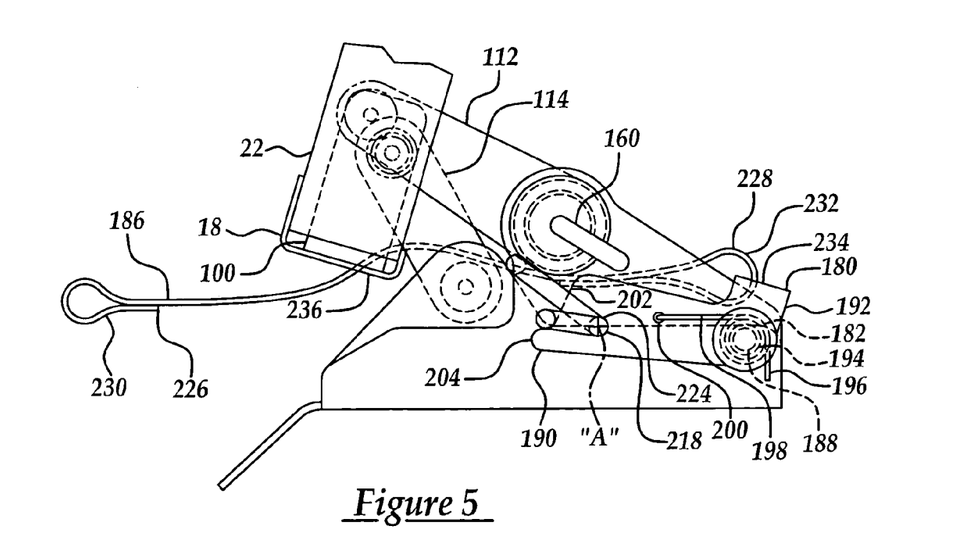
FIG. 5 is a side view of the blocking assembly of the present invention illustrated in the locked tumbled position.
Figure 6:
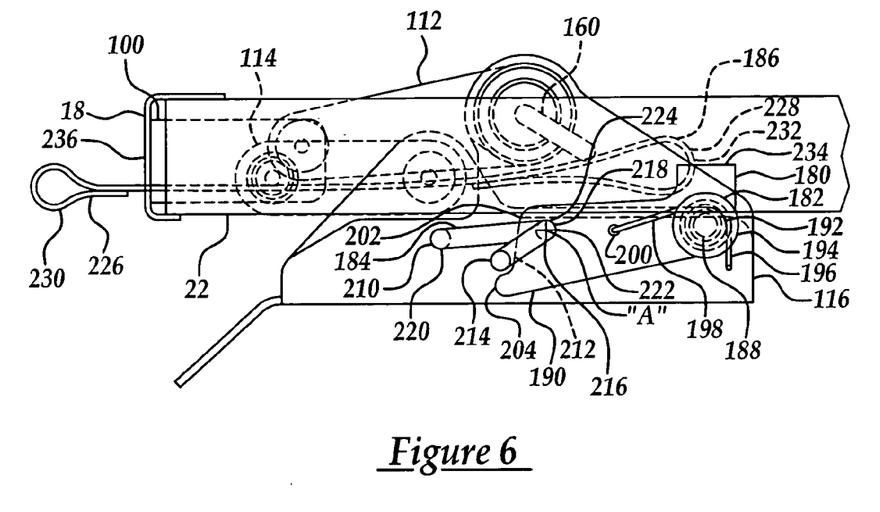
FIG. 6 is side view of the blocking assembly of the present invention illustrated in the unlocked seating position.

As shown in FIG. 6, once the seat assembly 10 has been operatively placed in the tumbled position, the blocking assembly 120 operatively locks the seat assembly 10 in place to prevent the seat assembly 10 from falling back unexpectedly. The blocking assembly 120 includes a blocking arm 180, a biasing member 182, a blocking rod 184, and a release member 186. As shown in the figures, the blocking arm 180 is pivotably mounted to an offset pin 188, which is disposed on the base plate 116. The blocking arm 180 operatively moves in rotation on the offset pin 188 between an unlocked and locked position. The biasing member 182 provides and maintains a biasing force on the blocking arm 180 such that it is influenced to move into the locked position when it is free to do so. The blocking arm 180 has a proximate end 190 and a distal end 192. The distal end 192 has a pivot opening 194, which is disposed on the offset pin 188. In the preferred embodiment, the biasing member 182 is a wound spring that is disposed about the offset pin 188 and the distal end 192 of the blocking arm 180. The biasing member 182 has a tension leg 196 that is operatively mounted to the base plate 116 and a tension leg 198 that is operatively mounted to the blocking arm 180 at 200 to provide the aforementioned biasing force. The blocking arm 180 is further defined as having a sloped surface 202 and a stop 204 along its proximate end 190. The sloped surface 202 and the stop 204 are adapted to operatively move the blocking rod 184 so that the blocking rod 184 holds the first linkage arm 112 in its tumbled position. As shown in FIGS. 3, 5, and 6, the blocking rod 184 has a center axis "A", a proximate end 210, a distal end 212, and four formed 90° curves 214, 216, 218, and 220 along its length, which cooperate to form a central portion 222 with two legs 224 and 226 that extend therefrom. As shown in the figures, the central portion 222 is defined about the center axis "A". The central portion 222 is disposed in an opening 224 in the base plate 116 such that the center axis "A" is horizontal. The two 90° curves 214 and 216 are formed between the central section 222 and the distal end 212 such that the distal end 212 is also horizontal and has a contact engagement with the sloped surface 202 and the stop 204 on the blocking arm 180. The two 90° curves 218 and 220 are formed between the central section 222 and the proximate end 210 such that the proximate end 210 is also horizontal and has a contact engagement with and rides along the lower edge of the first linkage arm 112 near its distal end 124. The two 90° curves 212 and 214 are not co-planer with the two 90° curves 216 and 218 such that the proximate and distal ends 210 and 212 of the blocking rod 184 are not co-planar to each other.

In this manner, the biasing member 182 that acts on the blocking arm 180 causes the sloped surface 202 and stop 204 to rotate the distal end 212 of the blocking rod 184 in a clockwise direction as shown in the figures. The clockwise rotation of the distal end 212 of the blocking rod 184 thereby causes a clockwise rotation of the proximate end 214 which brings it into contact with the lower edge of the first linkage arm 112 and further causes it to ride along the first linkage arm 112 when the seat assembly 10 is tumbled. As shown in FIG. 5, when the first linkage arm 112 reaches the highest point in its tumble rotation, the blocking rod 184 in combination with the blocking arm 180 prevents the first linkage arm 112 from rotating back to the seating position, thereby locking the seat assembly 10 in the tumbled position.

In the preferred embodiment, the release member 186 is a strap formed of a flexible material having proximate end 226 and a distal end 228. The release member 186 has a loop 230 formed on the proximate end 226 and a loop 232 formed on the distal end 228. The blocking arm 180 further includes a release slot 234 at its distal end 228 that accepts and retains the loop 232. The proximate end 226 and the loop 230 are routed through a slot 236 in the front member 18 of the seat frame 16 so that it is readily accessible in front of the seat assembly 10 when the seat is in the tumbled position. When it is desirable to unlock the seat assembly 10 from its tumbled position, the operator pulls on the loop 230 on the proximate end 226 of the release strap 186 causing the blocking arm 180 to pivot counter-clockwise, as illustrated in FIG. 6, which allows the proximate end 190 of the blocking rod 184 to fall away from the first linkage arm 112. This removal of the blocking rod 184 from the first linkage arm 112 allows the first linkage arm to move counter-clockwise and return to the seating position. It should be appreciated that the torsion tube assembly 118 described above also maintains torsional biasing on the first linkage arms 112, which assists in keeping the seat assembly 10 in the tumbled position. Thus, when returning the seat to the seating position the operator must exert some measure of downward force on the rear of the seat assembly 10 to untumble the seat once the release strap 186 has moved the blocking assembly 120 to the unlock position.

The seat assembly 10 of the present invention overcomes the drawbacks and disadvantage of the prior art seat fold and tumble assemblies by providing a seat support assembly that causes the seat frame to move rearward as it is tumbled forward. This prevents the folded and tumbled seat from occupying the area immediately behind the front seat allowing the front seat to be moved farther rearward as is necessary to provide additional legroom and riding comfort for the front seat occupant. Furthermore, the present invention negates the prior art requirement of moving the front seat forward first before tumbling the mid or rear seat.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle seat assembly comprising:
   a seat backrest;
   a seat bottom;
   a seat frame having a front member and a rear member, said seat frame operatively supporting said seat bottom and further having at least one backrest rotating mechanism supported at said rear member that is adapted to allow said seat backrest to move between an upright position and a folded position in which said seat backrest is folded down upon said seat bottom, said seat frame further having at least one first pair of linkage attachment points on said front member to allow said rear member of said seat frame to be rotatively lifted upward and forward and move said seat frame from a seating position to a tumbled position relative to said front member;
   at least one tumble mechanism is operatively disposed between said front member of said seat frame and the vehicle floor, said tumble mechanism having a first and a second linkage arm, and a base plate fixedly mounted to the vehicle floor, said first and second linkage arms are operatively and pivotably mounted to said front member of said seat frame and pivotably mounted to said base plate;
   said first and second linkage arms having two unequal length lever arms which work cooperatively to cause said front member of said seat assembly to move rearward in an arcuate path as said rear member is lifted.

2. A vehicle seat assembly as set forth in claim 1 wherein said first pair of linkage attachment points on said front member are non-coaxial and one of said first pair of linkage attachment points is disposed higher relative to the vehicle floor than the other.

3. A vehicle seat assembly as set forth in claim 1 wherein said base plate further includes a second pair of linkage attachment points for said first and said second linkage arms wherein said second pair of linkage attachment points are non-coaxial and one of said second pair of linkage attachment points is disposed higher relative to the vehicle floor than the other.

4. A vehicle seat assembly as set forth in claim 1 further including two of said tumble assemblies disposed proximate to each end of said front member and a torsion tube assembly disposed in parallel relationship to said front member between said two tumble mechanisms such that the ends of said torsion tube assembly are operatively fixed to said first linkage arms of said two tumble mechanisms thereby operatively joining said first linkage arms together to cause both said tumble mechanisms to pivot in unison when said seat assembly is lifted.

5. A vehicle seat assembly as set forth in claim 4 wherein said torsion tube assembly further includes a tube body and a torsion rod, said tube body having a distal and a proximate end and said torsion rod having a distal and a proximate end, said torsion rod disposed within said tube body and having said distal end fixedly mounted to said distal end of said tube body and having said proximate end fixedly mounted to said base plate, said torsion rod operatively twisted along its length relative to the tube body such that a torsional biasing force is imparted to the tube body to maintain a preloaded angular biasing force on said linkage arms to assist in the rotational movement of the tumble mechanism.

6. A vehicle seat assembly as set forth in claim 1 wherein said tumble mechanism further includes a locking arm supported upon said base plate and operable to move between a lock position and a release position such that said locking arm operatively engages said first linkage arm when said rear member of said seat frame is rotatively lifted upward and forward to move said seat frame from said seating position to said tumbled position and to hold said seat assembly in said tumbled position.

7. A vehicle seat assembly as set forth in claim 6 wherein said tumble mechanism further includes a biasing member and a release member, said biasing member operable to hold said locking arm in said lock position and said release member operable to selectively move said lock member to said release position thereby unlocking said seat assembly and allowing it to be moved to said seating position from said tumbled position.

8. A vehicle seat assembly as set forth in claim 1 wherein said seat assembly further includes at least one floor striker assembly having a ball latch assembly and a floor striker bracket, said ball latch assembly operatively disposed on said rear member, said floor striker bracket fixedly mounted to the vehicle floor beneath said ball latch assembly such that when said seat assembly is in the seating position said ball latch assembly engages said floor striker bracket and holds said seat assembly to the vehicle floor.

9. A vehicle seat assembly as set forth in claim 8 wherein said ball latch assembly further includes at least one ball latch having a locating pin and at least one captured and spring biased ball that protrudes laterally from the side of said locating pin to engage a latch opening in said striker bracket, such that when said locating pin is set into said latch opening said ball is depressed as it passes through said latch opening and then re-extends to hold the seat assembly to said floor striker bracket.

10. A vehicle seat assembly as set forth in claim 9 wherein said seat assembly further includes a pair of said floor striker assemblies each operatively mounted on the underside of the ends of the rear member and joined by a release bar, said release bar operable to simultaneously release both said ball latches from said floor striker brackets.

11. A vehicle seat assembly as set forth in claim 1 wherein said at least one backrest rotating mechanism includes a locking mechanism having a release lever and a locking pin that engages a lock opening to operatively lock said backrest in the upright seating position supported at said rear member and is further adapted to selectively release said seat backrest to allow it to be moved to a folded position.

12. A vehicle seat assembly as set forth in claim 11 wherein said locking mechanism further includes a second lock opening such that said seat backrest may also be locked in the folded position by said release lever.

13. A vehicle seat tumble mechanism comprising:
a seat frame having a front member, a rear member, two side members, said front and said rear member disposed in a spaced parallel relationship with said side members disposed in a spaced parallel relationship therebetween, said front member further having at least one first pair of linkage attachment points to allow said rear member of said seat frame to be rotatively lifted upward about said front member to move said seat frame from a generally horizontal position to a generally vertical position relative to said front member;
a first and a second linkage arm, and a base plate, said base plate fixedly mounted to the floor of a vehicle, said first and second linkage arms operatively and pivotably mounted to said front member of said seat frame and pivotably mounted to said base plate, said first and second linkage arms having two unequal length lever arms that work cooperatively to cause said front member of said seat assembly to move rearward in said vehicle in an arcuate path as said rear member is lifted.

14. A vehicle seat tumble mechanism as set forth in claim 13 further including a torsion tube assembly and two said base plates, each said base plate having a pair of first and second linkage arms, said base plates disposed proximate to each end of said front member such that the ends of said torsion tube assembly are operatively fixed to said first linkage arms thereby operatively joining said first linkage arms together to cause both to pivot in unison when said seat tumble mechanism is lifted.

15. A vehicle seat tumble mechanism as set forth in claim 14 wherein said torsion tube assembly further includes a tube body and a torsion rod, said tube body having a distal and a proximate end and said torsion rod having a distal and a proximate end, said torsion rod disposed within said tube body and having said distal end fixedly mounted to said distal end of said tube body and having said proximate end fixedly mounted to said base plate, said torsion rod operatively twisted along its length in a relative to the tube body such that a torsional biasing force is imparted to the tube body to maintain a preloaded angular biasing force on said linkage arms to assist in the rotational movement of the tumble mechanism.

16. A vehicle seat tumble mechanism assembly as set forth in claim 13 further including a locking arm supported upon said base plate and operable to move between a lock position and a release position such that said locking arm operatively engages said first linkage arm when said rear member of said seat frame is rotatively lifted upward and forward to move said seat frame from said generally horizontal position to said generally vertical position and to hold said seat tumble mechanism in place.

17. A vehicle seat tumble mechanism as set forth in claim 16 further including a biasing member and a release member, said biasing member operable to hold said locking arm in said lock position and said release member operable to selectively move said lock member to said release position thereby unlocking said seat tumble mechanism and allowing it to be moved to said generally horizontal position from said generally vertical position.

18. A vehicle seat assembly as set forth in claim 13 wherein said seat tumble mechanism further includes at least one floor striker assembly having a ball latch assembly and a floor striker bracket, said ball latch assembly operatively disposed on said rear member, said floor striker bracket fixedly mounted to the vehicle floor beneath said ball latch assembly such that when said seat tumble mechanism is in the generally horizontal position said ball latch assembly engages said floor striker bracket and holds said seat tumble mechanism in place.

19. A vehicle seat assembly as set forth in claim 18 wherein said ball latch assembly further includes at least one ball latch having a locating pin and at least one captured and spring biased ball that protrudes laterally from the side of said locating pin to engage a latch opening in said striker bracket such that when said locating pin is set into said latch opening said ball is depressed as it passes through said latch opening and then re-extends to hold the seat tumble mechanism to said floor striker bracket.

20. A vehicle seat assembly as set forth in claim 19 wherein said seat tumble mechanism further includes a pair of said floor striker assemblies each operatively mounted on the underside of the ends of the rear member and joined by a release bar, said release bar operable to simultaneously release both said ball latches from said floor striker brackets.

* * * * *